US009893341B2

(12) United States Patent
Chen et al.

(10) Patent No.: US 9,893,341 B2
(45) Date of Patent: Feb. 13, 2018

(54) BATTERY PACK AND DEVICE FOR CONNECTING TABS OF BATTERY CELLS IN THE SAME

(71) Applicant: Contemporary Amperex Technology Limited, Ningde, Fujian (CN)

(72) Inventors: Yajie Chen, Ningde (CN); Weibo Zou, Ningde (CN); Yangang Yang, Ningde (CN)

(73) Assignee: CONTEMPORARY AMPEREX TECHNOLOGY LIMITED, Ningde (CN)

( * ) Notice: Subject to any disclaimer, the term of this patent is extended or adjusted under 35 U.S.C. 154(b) by 182 days.

(21) Appl. No.: 14/660,938

(22) Filed: Mar. 18, 2015

(65) Prior Publication Data

US 2015/0270526 A1  Sep. 24, 2015

(30) Foreign Application Priority Data

Mar. 18, 2014  (CN) ..................... 2014 2 0122187 U

(51) Int. Cl.
*H01M 2/20* (2006.01)
*H01M 2/10* (2006.01)
*H01M 10/0525* (2010.01)

(52) U.S. Cl.
CPC ......... *H01M 2/206* (2013.01); *H01M 2/1077* (2013.01); *H01M 10/0525* (2013.01)

(58) Field of Classification Search
None
See application file for complete search history.

(56) References Cited

U.S. PATENT DOCUMENTS

2009/0323293 A1*  12/2009  Koetting ............. H01M 10/425
                                                        361/736
2014/0011071 A1*  1/2014  Suzuki ................ H01M 2/0237
                                                        429/153

FOREIGN PATENT DOCUMENTS

WO    WO 201213180 A1 *  10/2012  .......... H01M 2/0237

* cited by examiner

*Primary Examiner* — Barbara Gilliam
*Assistant Examiner* — Wyatt McConnell

(57) ABSTRACT

A device for connecting tabs of battery cells includes an isolation board defining a first through slot seated on the surfaces of the battery cells from which the tabs extending out; a metal plate mounted on a surface of the isolation board afar from the battery cells, the metal plate defining a second through slot corresponding to the first through slot of the isolation board; and a metal conductive plate secured to the metal plate. The tabs of the battery cells extending through the first through slot and the second through slot are bent and seated on a surface of the metal plate afar from the isolation board, and the metal conductive plate is detachably fastened to the metal plate so that the tabs of the battery cells are securely sandwiched between the metal plate and the metal conductive plate.

8 Claims, 4 Drawing Sheets

BATTERY PACK AND DEVICE FOR CONNECTING TABS OF BATTERY CELLS IN THE SAME

CROSS-REFERENCE TO RELATED APPLICATION

The present patent application claims priority to Chinese patent application number CN201420122187.8 filed on Mar. 18, 2014, which is incorporated by reference herein in its entirety.

TECHNICAL FIELD

The present invention generally relates to batteries and, more particularly, relates to a battery pack and a device for connecting tabs of battery cells in the battery pack.

BACKGROUND

With more and more attention has been paid to low carbon life in modern daily life, lithium ion batteries are becoming increasingly popular. Flexible lithium ion batteries have been widely used in energy store stations and electric vehicles due to low mass, high energy density and low cost. Generally, a flexible lithium ion battery pack includes a number of flexible battery cells connected in series or in parallel.

Flexible lithium ion battery generally has small thickness. Tabs of the flexible lithium ion battery generally are made from metal foil having desirable conductivity, such as copper foil, aluminum foil or nickel foil. At present, tabs of the flexible lithium ion batteries are generally connected to each other via laser soldering, ultrasonic welding or tin soldering. Soldering connection has high stability, high reliability and high degree of automation.

However, the connection of tabs of battery cells in prior art at least has the following disadvantages:
1) The tin solder may lead to high temperature on the surfaces of the tabs, which may lead to high temperature in the lithium ion battery cells due to heat transfer and further adversely affect the cycling performance and stability of the battery cells;
2) Laser welding and ultrasonic welding are both irreversible welding. Once be soldered, the components cannot be detached. In the use of the battery pack, if one or more lithium ion battery cells fail to function properly, the one or more malfunctioned lithium ion battery cells cannot be replaced, which will adversely affect the use of other lithium ion battery cells until the battery pack cannot be used anymore and lead to waste of resource.
3) Flexible lithium ion battery generally has small thickness, and the distance between different tabs is also very small. There is no adequate space for carrying out laser welding or ultrasonic welding, which will affect the soldering operation as well as lead to damage to the tabs during soldering operation.

In view of the foregoing, what is needed, therefore, is to provide a device for connecting tabs of battery cells which can be assembled and disassembled readily.

BRIEF SUMMARY OF VARIOUS EMBODIMENTS OF THE INVENTION

One object of the present invention is to provide a device for connecting tabs of battery cells which can be assembled and disassembled readily.

According to one embodiment of the present invention, a device for connecting tabs of battery cells includes an isolation board defining a first through slot seated on surfaces of the battery cells from which the tabs extending out; a metal plate mounted on a surface of the isolation board afar from the battery cells, the metal plate defining a second through slot corresponding to the first through of the isolation board; and a metal conductive board secured to the metal plate, wherein the tabs of the battery cells extending through the first through slot and the second through slot are bent and seated on a surface of the metal plate afar from the isolation board, and the metal conductive board is detachably fastened to the metal plate so that the tabs of the battery cells are sandwiched between the metal plate and the metal conductive board securely.

According to one aspect of the present invention, the metal plate is formed with at least one rib, the metal conductive board is provided with at least one groove for suitably receiving the at least one rib, and the tabs of the battery cells are tightly sandwiched between the at least one rib and the at least one groove in engagement with each other.

According to one aspect of the present invention, the isolation board is provided with a recess, and the metal plate and the metal conductive board are suitably received and positioned in the recess.

According to one aspect of the present invention, the metal plate and the isolation board are coupled with each other via hooks and screws, and the metal conductive board and the metal plate are also coupled with each other via hooks and screws.

According to one aspect of the present invention, the isolation board is formed with a stopper for limiting a first end of the metal plate and is provided with a screw hole corresponding to a second end of the metal plate; the first end of the metal plate is formed with a receiving portion for suitably receiving a first end of the metal conductive board, the second end of the metal plate is formed with a screw hole, a second end of the metal conductive board is provided with a screw hole corresponding to the screw hole defined in the second end of the metal plate, the stopper of the isolation board limits horizontal and vertical movement of the first end of the metal plate, the first end of the metal conductive board is positioned in the receiving portion of the metal plate, and the second ends of the metal plate and the metal conductive board are fastened to the isolation board via screws.

According to another embodiment of the present invention, a battery pack is provided. The battery pack includes two or more housings secured to each other; two or more battery cells correspondingly received in the housings, each battery cell being formed with tabs; an isolation board seated on surfaces of the battery cells from which the tabs extending out; and at least one metal conductive boards each defining a first through slot and at least one metal plates each defining a second through slot coupled to the isolation board. The tabs of the battery cells extending through the first through slot and the second through slot are bent and seated on a surface of the metal plate afar from the isolation board, and the metal conductive board is fastened to the metal plate so that the tabs of the battery cells are sandwiched between the metal plate and the metal conductive board securely.

According to one aspect of the present invention, the metal plate is formed with a rib, the metal conductive board is provided with a groove for suitably receiving the rib, and at least part of the tabs of the battery cells is sandwiched between the rib and the groove in engagement with each other.

According to one aspect of the present invention, the isolation board is provided with a recess, the metal plate and the metal conductive board are suitably received in the recess, the metal plate and the isolation board are coupled with each other via hooks and screws, and the metal conductive board and the metal plate are also coupled with each other via hooks and screws.

According to one aspect of the present invention, the isolation board is formed with a stopper for limiting a first end of the metal plate and is provided with a screw hole corresponding to a second end of the metal plate; the first end of the metal plate is formed with a receiving portion for suitably receiving a first end of the metal conductive plate, the second end of the metal plate is formed with a screw hole, a second end of the metal conductive board is provided with a screw hole corresponding to the screw hole defined in the second end of the metal plate, the stopper of the isolation board limits horizontal and vertical movement of the first end of the metal plate, the first end of the metal conductive board is positioned in the receiving portion, and the second ends of the metal plate and the metal conductive board are fastened to the isolation board via screws.

According to one aspect of the present invention, the metal conductive board is a rigid board.

Compared with the prior art, according to one embodiment of the present invention, the tabs of the battery cells are sandwiched between the metal plate and the metal conductive board which are detachably coupled with each other. Therefore, the tabs of battery cells can be connected stably and readily. In addition, in the battery pack of the present invention, any one or more battery cells can be disassembled and changed readily. The life spane and quality of the battery pack will not be dominated by a single battery cell, which will remarkably improve the service performance and maintenance performance of the battery pack, and reduce the use cost of the battery pack.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

BRIEF SUMMARY OF VARIOUS EMBODIMENTS OF THE INVENTION

DETAILED DESCRIPTION OF VARIOUS EMBODIMENTS OF THE INVENTION

Figure 1:
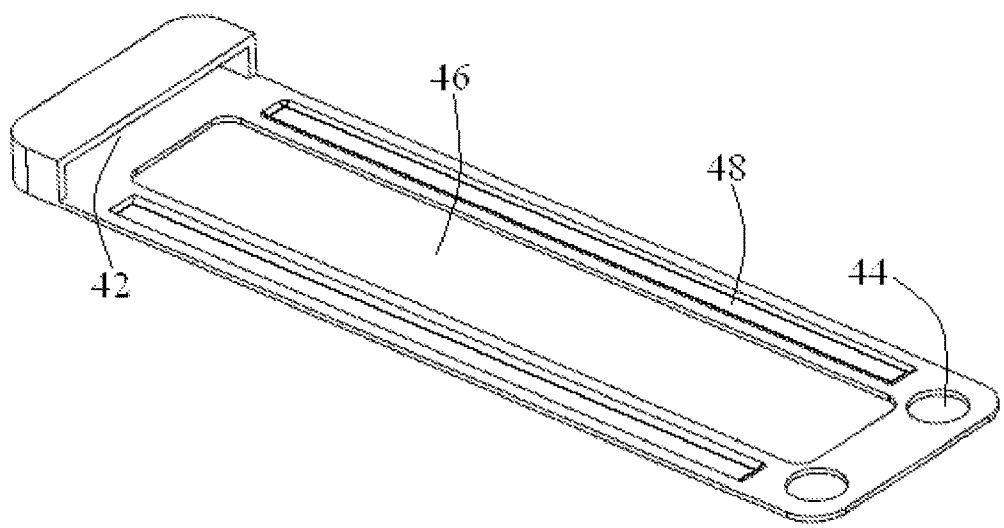
FIG. 1 depicts an exemplary perspective view of a metal plate for use in a device for connecting tabs of battery cells according to one embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Referring to FIGS. 1 to 5, a battery pack according to one embodiment of the present invention includes two or more battery cells 10 each formed with tabs (such as flexible lithium ion battery cells), two or more housing 20 for correspondingly receiving the battery cells 10, and a device for connecting tabs of the battery cells 10. The device for connecting tabs of battery cells 10 includes an isolation board 30, at least one metal plate 40, at least one metal conductive board 50 and a number of screws 60.

The battery cell 10 includes a positive tab 12 and a negative tab 14 extending upwardly and outwardly. In the embodiment a shown, the positive tab 12 is an aluminum plate having a thickness of 0.1 mm-0.5 mm. The negative tab 14 is a copper plate having a thickness of 0.1 mm-0.5 mm.

The housing 20 is a plastic housing which defines a chamber for suitably receiving the battery cell 10 therein. Each housing 20 defines a number of screw holes for fastening the housing 10 with other housing 10.

Figure 3:
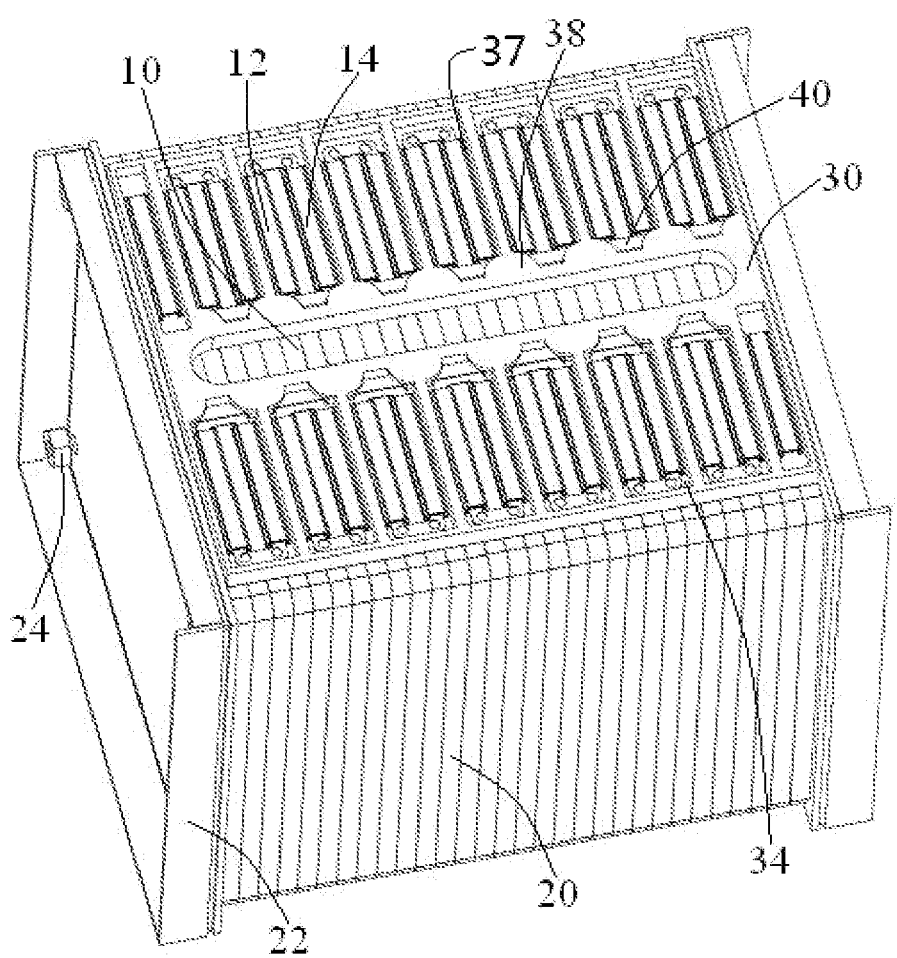
FIG. 3 depicts an exemplary partly assembled view of a battery pack in accordance with one embodiment of the present invention, wherein a metal conductive board has not been assembled.
Figure 4:
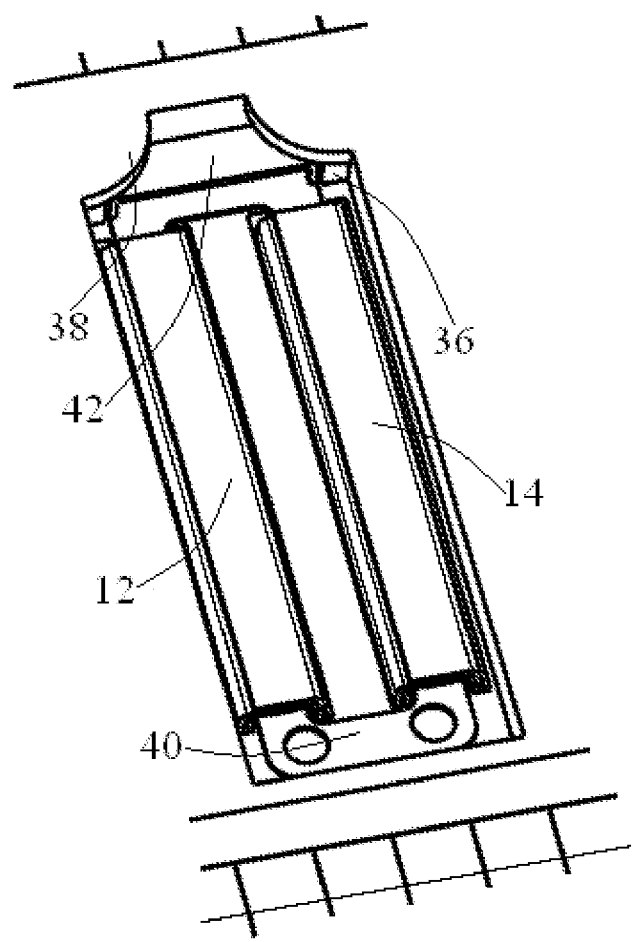
FIG. 4 depicts an exemplary enlarged view of a metal plate seated on an isolation board of a device for connecting tabs of battery cells according to one embodiment of the present invention.

Referring to FIGS. 3 and 4, the isolation board 30 is made from ABS+PC which have desirable antiflaming performance and electrical insulation performance. Upper surface of the isolation board 30 defines a recess 34 for receiving the metal plate 40. A first end of the isolation board 30 is formed with a stopper for restricting horizontal and vertical movement of the metal plate 40. A second end of the isolation board 30 is provided with at least one screw hole. A middle portion of the isolation board 30 is provided with a first through slot 37. The positive tab 12 and the negative tab 14 of the lithium ion battery cell 10 can extend out upwardly through the first through slot 37.

In the embodiment as illustrated, the stopper at the first end of the isolation board 30 includes a horizontal stopper 36 and a vertical stopper 38. The horizontal stopper 36 includes two protrusions extending from two sidewalls around the first end of the recess 34. The vertical stopper 38 includes two arc plates located above the first end of the isolation board 30. According to alternative embodiments of the present invention, shape and position of the stopper can be adjusted according to actual requirements. For instance, in an alternative embodiment of the present invention, the stopper can be a receiving chamber for suitably receiving the first end of the metal plate 40. In other words, the stopper can be any structure which is configured to restrict the horizontal and vertical movement of the metal plate 40, so as to prevent the metal plate 40 from moving in the recess 34.

Referring to FIG. 1, the metal plate 40 is a rectangular plate. A first end of the metal plate 40 extends upwardly then laterally, to define a receiving portion 42 which can compliantly receive the first end 52 of the metal conductive board 50. A second end of the metal plate 40 defines two screw holes 44. Main portion of the metal plate 40 between the first end 52 and the second end 54 defines a second through slot 46. The metal plate 40 also defines two strip shaped grooves 48 at two sides of the second through slot 46.

Figure 2:
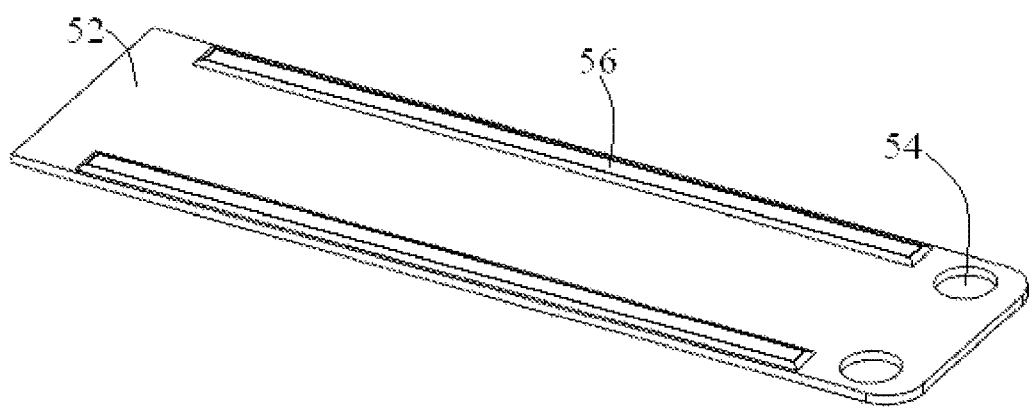
FIG. 2 depicts an exemplary perspective view of a metal conductive board for use in a device for connecting tabs of battery cells according to one embodiment of the present invention.

Referring to FIG. 2, the metal conductive board 50 is a rectangular metal plate having high rigidity. A first end 52 of the metal conductive board 50 can be suitably received in the receiving portion 42 of the metal plate 40. A second end of the metal conductive board 50 defines two screw holes 54 corresponding to the screw holes 44 defined in the metal plate 40. Lower surface of the metal conductive board 50 is formed with two ribs 56 at two sides thereof, corresponding to the grooves 48 defined in the metal plate 40.

Each screw 60 has a diameter of 3 mm.

Figure 5:
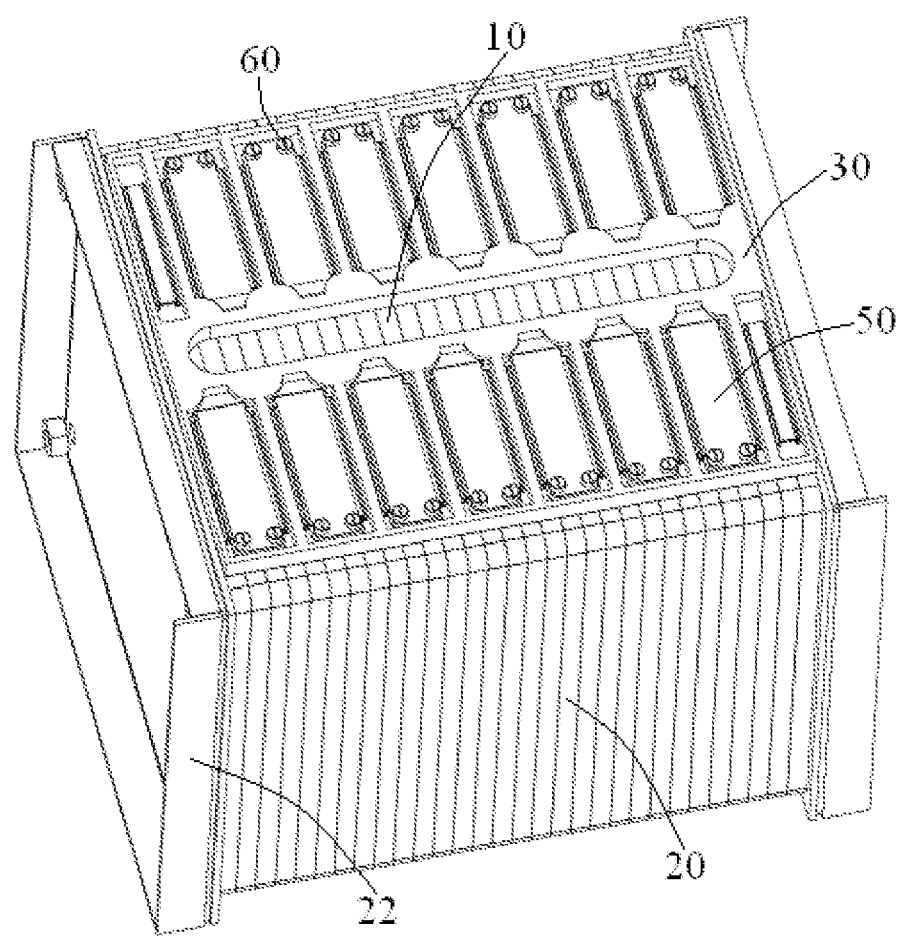
FIG. 5 depicts an exemplary assembled view of a battery pack according to one embodiment of the present invention.

Referring to FIGS. 3 to 5, in assembly, surfaces of the battery cells 10 are cleaned via ultrasonic wave. The battery cells 10 are correspondingly assembled in the housings 20. The housings 20 are arranged according to actual requirement of the battery cells 10 in series or in parallel. Two end boards 22 are set at two ends of the housings 20. A screw rod extends through the screw holes (not shown) defined in the end boards 22 and the housings 20 and is secured via a cap nut 24, so as to secure the housings 20 to each other and fix the battery cells 10.

The isolation board 30 is set on surfaces of the battery cells 10 from which the tabs extend out. The positive tabs 12 and the negative tabs 14 of the battery cells 10 extend through the first through slot 37 and the second through slot 46 and further extend out of the isolation board 30. The metal plates 40 are correspondingly disposed in the recesses 34 of the isolation board 30. The first end of the metal plate 40 is inserted into the isolation board 30 and seated under the vertical stopper 38. The upper surface of the metal plate 40 contacts the lower surface of the vertical stopper 38. End wall and two side walls of the metal plate 40 contact the first end wall around the recess 34 and the horizontal stopper 36 respectively, so that the metal plate 40 can be securely seated in the corresponding recess 34.

Ends of the positive tabs 12 and negative tabs 14 extending out upwardly from the first through slot 37 and the second through slot 46 are bent to seated on the surface of the metal plate 40 and hang above the groove 48. The metal conductive board 50 is set on the upper surface of the metal plate 40. The first end of the metal conductive board 50 is inserted into the receiving portion 42 of the metal plate 40. The screw holes 54 on the second end of the metal conductive board 50 register with the screws holes 44 of the metal plate 40. In this case, the ribs 56 of the metal conductive board 50 are registered with the grooves 48 defined in the metal plate 40. Finally, the metal conductive board 50 and the metal plate 40 are fastened to the isolation board 30 via screws 60, thereby finishing the assembly of the battery pack. In this case, at least part of the tabs of the battery cells 10 is sandwiched between the rib 56 and the groove 48 in engagement with each other.

In the embodiment as illustrated, the metal conductive board 50 is a rectangular metal plate which has desirable rigidity, so as prevent the middle portion of the metal conductive board 50 from deforming. In this case, the metal conductive board 50 can rigidly resist against the upper surfaces of the tabs of the battery cells 10 when the metal conductive board 50 is fastened to the metal plate 40 via the screws 60 and hooks, so as to realize engagement of the ribs 56 and the grooves 48 of the metal plate 40 as well as connect the tabs of the battery cells 10 tightly and stably.

In an assembled battery pack, the tabs of the battery cells 10 are sandwiched between the metal plate 40 and the metal conductive board 50 and contact with each other, thereby connecting the battery cells 10 in series and/or in parallel.

Due to the engagement of the ribs 56 of the metal conductive board 50 and the grooves 48 of the metal plate 40, the tabs of the battery cells 10 can tightly and fully contact with the metal plate 40 and the metal conductive board 50, so as to realize stable connection.

In addition, components of the device for connecting tabs of battery cells are detachably connected with each other via hooks or screws. During the use of the battery pack, if one battery cell 10 fails to function properly, the screws 60 can be disassembled, the metal plate 40 and the metal conductive board 50 can be released, the cap nut 24 can be disassembled, the screw rod for fixing the battery housing 20 can be peeled off and the malfunctioned battery cell 10 can be replaced easily.

It should be understood by one ordinary skilled in the art that, the device for connecting tabs of battery cells according to the present invention not only can be used in a lithium ion battery pack, but also can be used to connect battery cells of Ni—H batteries, Ni—Ge batteries in series and/or in parallel.

According to the embodiments of the present invention described previously, the device for connecting tabs of battery cells of the present invention has the following advantages.

1) Compared with tin soldering, damage to battery cells due to high temperature can be avoided. During the connection of the tabs of the battery cells, no soldering material is needed.

2) Compared with laser welding and ultrasonic welding, the hooks and screws of the device for connecting tabs of battery cells according to the present invention can be operated readily and only small space is needed. Damage to the tabs of the battery cells due to interference in soldering operation in a small space can be avoided.

3) Detachable connection of the tabs of the lithium ion battery cells can facilitate replacement of battery cells and improve the service performance and maintenance performance of the battery pack.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. A device for connecting tabs of battery cells, comprising:
  an isolation board defining a first through slot seated on upper surfaces of the battery cells from which the tabs extending out;
  a metal plate mounted on an upper surface of the isolation board, the metal plate defining a second through slot corresponding to the first through slot of the isolation board; and
  a metal conductive board secured to the metal plate,
  wherein the tabs of the battery cells extending through the first through slot and the second through slot are bent and seated on an upper surface of the metal plate, and the metal conductive board is detachably fastened to the metal plate so that the tabs of the battery cells are sandwiched between the metal plate and the metal conductive board securely; and wherein the metal plate is formed with at least one rib, the metal conductive board is provided with at least one groove for receiving the at least one rib, and the tabs of the battery cells are sandwiched between the at least one rib and the at least one groove in engagement with each other.

2. The device for connecting tabs of battery cells of claim 1, wherein the isolation board is provided with a recess, the metal plate and the metal conductive board are received and positioned in the recess.

3. The device for connecting tabs of battery cells of claim 1, wherein the metal plate and the isolation board are coupled with each other via hooks and screws, and the metal conductive board and the metal plate are coupled with each other via hooks and screws.

4. The device for connecting tabs of battery cells of claim 1, wherein the isolation board is formed with a stopper for limiting a first end of the metal plate and is provided with a screw hole corresponding to a second end of the metal plate; the first end of the metal plate is formed with a receiving portion for receiving a first end of the metal conductive board, the second end of the metal plate is formed with a screw hole, a second end of the metal conductive board is provided with a screw hole corresponding to the screw hole defined in the second end of the metal plate, the stopper of the isolation board limits horizontal and vertical movement of the first end of the metal plate, the first end of the metal conductive board is positioned in the receiving portion of the metal plate, and the second ends of the metal plate and the metal conductive board are fastened to the isolation board via screws.

5. A battery pack, comprising:
two or more housings secured to each other;
two or more battery cells correspondingly received in the housings, each battery cell being formed with tabs;
an isolation board defining a first through slot seated on upper surfaces of the battery cells from which the tabs extending out; and
a metal conductive board and a metal plate defining a second through slot coupled to the isolation board;
wherein the tabs of the battery cells extending through the first through slot and the second through slot are bent and seated on an upper surface of the metal plate, and the metal conductive board is detachably fastened to the metal plate so that the tabs of the battery cells are sandwiched between the metal plate and the metal conductive board securely.

6. The battery pack of claim 5, wherein the metal plate is formed with a rib, the metal conductive board is provided with a groove for receiving the rib, and at least part of the tabs of the battery cells is sandwiched between the rib and the groove in engagement with each other.

7. The battery pack of claim 5, wherein the isolation board is provided with a recess, the metal plate and the metal conductive board are received in the recess, the metal plate and the isolation board are coupled with each other via hooks and screws, and the metal conductive board and the metal plate are coupled with each other via hooks and screws.

8. The battery pack of claim 5, wherein the isolation board is formed with a stopper for limiting a first end of the metal plate and is provided with a screw hole corresponding to a second end of the metal plate; the first end of the metal plate is formed with a receiving portion for receiving a first end of the metal conductive board, the second end of the metal plate is formed with a screw hole, a second end of the metal conductive plate is provided with a screw hole corresponding to the screw hole defined in the second end of the metal plate, the stopper of the isolation board limits horizontal and vertical movement of the first end of the metal plate, the first end of the metal conductive board is positioned in the receiving portion, and the second ends of the metal plate and the metal conductive board are fastened to the isolation board via screws.

* * * * *